Patented Feb. 16, 1932

1,845,281

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF ANTHRAQUINONE

No Drawing.   Application filed August 1, 1923. Serial No. 296,869.

This invention relates to the purification of anthraquinone.

When anthraquinone of various degrees of purity is produced by catalytic oxidation of impure anthracene or by other oxidation processes, such as, for example, chromic acid oxidations, there are frequently impurities which must be removed if the anthraquinone is to be used for the production of dyestuffs as they seriously affect the yields and quality of the products obtained in succeeding operations. Particularly it is necessary to remove any carbazole or phenanthrene oxidation products present.

According to the present invention crude anthraquinone is subjected to one or more treatments with solvents, at least one of which contains a heterocyclic compound. Various types of liquid heterocyclic compounds may be used such as those containing sulfur, such as, for example:— thiophene, its homologues and their liquid derivatives; those containing nitrogen, such as pyrrol, its homologues and derivatives; quinoline, its homologues and derivatives; and pyridine together with its homologues and derivatives. The preferred heterocyclic compounds are those containing the furane nucleus:

such as furane and alkyl furanes, furfural and its homologues, furfuryl alcohol and esters of furoic acid. Solvents containing compounds with a hydrogenated furane nucleous, such as tetrahydrofurfuryl alcohol may also be used, and it should be understood that throughout the specification the term "furane body" will be used to cover not only the compounds which contain the actual furane nucleus but also those which contain the hydrogenated furane nucleus. Solvents containing furane bodies show a very high solvent power in the cold for carbazole and phenanthrene and most of the other impurities present in crude anthraquinone, but they show a remarkably low solvent power in the cold for anthraquinone itself and are, therefore, excellently suited for the purification of crude anthraquinone. While the desirable solvent properties are shared in a greater or less degree by all of the furane bodies, the furfurals are the most efficient and because of their low price may be considered the preferred solvents. Their high boiling point reduces losses and gives a greater temperature range for recrystallization and thus makes them preferable to the furanes themselves, which are relatively low boiling. Furfuryl and tetrahydrofurfuryl alcohol possess high boiling points and good solvent powers, but are open to the disadvantage that they are miscible with water. The furfurals, however, possess all of the good qualities of the other furane bodies with a minimum of undesirable qualities.

Not only are the solvents containing furane bodies advantageous because of their vary great solvent efficiency and low cost of the preferred members, such as the furfurals, but they are all relatively non-toxic and possess odors which are not unpleasant, a very important advantage when they are compared, for example, with pyridine, which, while an effective solvent, possesses a most unpleasant odor, which constitutes a serious nuisance and greatly restricts its use.

In carrying out the present invention, crude anthraquinone may be subjected to a single treatment, either recrystallization, washing or leaching with a solvent containing a heterocyclic compound and preferably a furane body, or, in some cases, particularly when the anthraquinone contains a large amount of impurities, it is desirable to subject it to two or more treatments, which may be with the same or with different solvents. Thus, for example, it is desirable in some cases to treat with a solvent for phenanthrene and its derivatives, such as, for example, alcohol, gasoline, acetone, aromatic hydrocarbons, such as benzene, toluene, solvent naphtha, and the like, halogenated aromatic compounds, particularly orthodichlor-benzene or the chlorinated residues from the chlorine purification of light oils, which contain many chlorinated aliphatic compounds as well as chlorinated alicyclic compounds. The treatments may be successive or a mixed solvent may be used in which one or more heterocyclic compounds, such as furane bodies, are associated with other solvents. When a plurality of solvent treatments are used they may be in any order, but preferably the last treatment should be with a solvent containing a heterocyclic compound and preferably a furane body in order to produce anthraquinone with the highest purity.

The invention will be described in connection with specific examples, which illustrate a few typical modifications. It should be understood, however, that the invention is in no sense limited to the details of the procedure therein set forth.

Example 1

100 parts of a dark brown, oily, crude anthraquinone, obtained by the catalytic oxidation of 29–31% crude anthracene with a vanadium catalyst and containing about 74.4% of anthraquinone, is heated to about 110° C. with 500 parts of furfural, methylfurfural, or a mixture of the two. The undissolved material is filtered off and the hot solution is permitted to cool. Anthraquinone separates out on cooling, and is filtered off.

The undissolved solids amount to about 38.4 parts, and when analyzed by the Hoechst method constitute anthraquinone of 95.2% purity. The recrystallized product is about 34.3 parts, and is an anthraquinone of 98.8% purity. A total anthraquinone recovery of 94.6% anthraquinone content of the crude material is, therefore, obtained. The undissolved solids and recrystallized product when mixed and subjected to the standard sublimation process result in an anthraquinone of 99.8% purity, which can be used with excellent results as a dye intermediate in dyestuff manufacture.

Instead of using furfurals, other solvents containing furane bodies, such as dimethyl furane, furfuryl alcohol, tetrahydrofurfuryl alcohol, and the like, may be used. The furfurals, however, give somewhat better results, and because of their lower price present a distinct economic advantage. Other liquid heterocyclic compounds, such as pyridine, pyrrol, thiophene and their homologues or derivatives may be used instead of solvents containing furane bodies and they give similar results but in the case of pyridine they are open to the serious disadvantage entailed in the vile odor of the solvent.

Instead of using an impure anthraquinone which has been obtained by the catalytic oxidation of crude anthracene, a different type of impure anthraquinone, prepared by chromic acid oxidation, may be purified in the same way. A high grade product is obtained, since the main impurities, such as hydrocarbons and their oxidation products, nitrogenous bases, as carbazole, phenanthrene, phenanthraquinone and dead oils are readily soluble in the solvents containing heterocyclic compounds.

Instead of recrystallizing the crude anthraquinone by treatment with hot furfural and cooling, it may be leached by washing with furfural or other solvents containing heterocyclic compounds, or by washing with a mixture of a solvent containing one or more heterocyclic compounds, such as furane bodies, and other solvents, such as benzol, toluol, solvent naphtha, gasoline, acetone, chlorinated hydrocarbons, such as chlorbenzene, orthodichlorbenzene, or the residue from the chlorine purification of light oil. A mixture of the solvents may be used for leaching, or, first one may be used and then the other, but it is preferable to use the solvent containing furfural or other heterocyclic compounds as the last solvent because of its high solvent action on carbazole and the other impurities.

Example 2

100 parts of the oily tailings from the catalytic oxidation of anthraquinone, and containing about 80.36% anthraquinone, are washed with up to 200 parts of a caustic soda solution in order to remove organic acids such as phthalic acid, benzoic acid, maleic acid and other acids of indeterminate constitution. The product is then dried and heated up to 100–120° with 1,000 parts of pure or technical furfural or pyridine or a mixture. The mixture is allowed to cool to room temperature, and the anthraquinone which precipitates out is filtered off.

80 parts of the purified anthraquinone are obtained, which, when analyzed by the Hoechst method, show a purity of 98.46%. The anthraquinone recovered, therefore, is about 97.9% of the anthraquinone content of the original crude material. The product when worked up into alizarin gives a good shade. If the product is sublimed by the standard sublimation methods an anthraquinone of 99.9% purity is obtained It should be noted that this crude anthraquinone normally contains about 5% of carbazole as part of its impurities. The marked solvent action of heterocyclic compounds on carbazole is clearly illustrated in the practically complete removal effected by the recrystallization.

Example 3

Various grades of crude anthraquinone are washed with benzol, toluol, solvent naphtha, acetone, gasoline, alcohol, orthodichlorbenzene or other chlorinated solvents in order to remove oils and hydrocarbons such as phenanthrene. A semi-purified anthraquinone of 92 to 94% purity is obtained in this matter, and is then washed with five to eight times its weight of furfural or pyridine at room temperature, or at a somewhat elevated temperature. After washing with furfural it is again washed with a small amount of one of the solvents used in the first treatment in order to displace a maximum of furfural from the anthraquinone cake, since the solvents used in the first process are for the most part cheaper, and in some cases very much cheaper, than furfural and especially pyridine, and the loss of the more expensive furfural or much more expensive pyridine is thereby reduced to a minimum. The resulting anthraquinone shows a purity of 98 to 98.8%, and can be transformed into 99.6 to 99.9% pure anthraquinone by sublimation. The recovery is from 85 to 90%, based on the anthraquinone content of the crude material.

What is claimed as new is:

1. A method of purifying impure anthraquinone, which comprises subjecting it to the action of at least one solvent containing at least one furane body in amounts sufficient to cause a substantial separation of the anthraquinone from impurities.

2. A method of purifying impure anthraquinone, which comprises subjecting it to the action of at least one solvent containing furfural in amounts sufficient to cause a substantial separation of the anthraquinone from impurities.

3. A method of purifying impure anthraquinone from the catalytic oxidation of impure anthracene which comprises subjecting it to the action of at least one solvent containing at least one furane body in amounts sufficient to cause a substantial separation of the anthraquinone from impurities.

4. A method of purifying impure anthraquinone from the catalytic oxidation of impure anthracene, which comprises subjecting it to the action of at least one solvent containing furfural in amounts sufficient to cause a substantial separation of the anthraquinone from impurities.

5. A method according to claim 1, in which at least one treatment with a solvent containing a furane body consists in a recrystallization from the solvent.

6. A method according to claim 2, in which at least one treatment with a solvent containing furfural consists in a recrystallization from the solvent.

7. A method of purifying impure anthraquinone, which comprises subjecting it to at least one treatment with a solvent consisting substantially of furane bodies in amounts sufficient to cause a substantial separation of the anthraquinone from impurities.

8. A method of purifying impure anthraquinone which comprises subjecting it to at least one treatment with a solvent consisting substantially of furfural in amounts sufficient to cause a substantial separation of the anthraquinone from impurities.

9. A method of purifying impure anthraquinone produced by the catalytic vapor phase oxidation of impure anthracene, which comprises subjecting it to at least one treatment with a solvent consisting essentially of furfural in amount sufficient to cause a substantial separation of the anthraquinone from impurities.

10. A method of purifying impure anthraquinone, which comprises subjecting it to the action of at least one furane body and at least one non-heterocyclic compound which possesses high solvent power for phenanthrene and its oxidation products in amounts sufficient to cause a substantial separation of the anthraquinone from impurities.

11. A method of purifying impure anthraquinone, which comprises subjecting it to the action of at least one furfural and at least one non-heterocyclic compound which possesses high solvent power for phenanthrene and its oxidation products in amounts sufficient to cause a substantial separation of the anthraquinone from impurities.

Signed at Pittsburgh, Pennsylvania, this 26th day of July, 1928.

ALPHONS O. JAEGER.